United States Patent

[11] 3,587,614

[72] Inventor Aiun Burke
Zurich, Switzerland
[21] Appl. No. 852,189
[22] Filed Aug. 22, 1969
[45] Patented June 28, 1971
[73] Assignee Contraves A G
Zurich, Switzerland
[32] Priority Sept. 4, 1968, Nov. 18, 1968
[33] Switzerland
[31] 13,287/68 and 17,171/68

[54] FLUIDIC COMPONENT WITH FLUID LOGIC ELEMENT
4 Claims, 3 Drawing Figs.

[52] U.S. Cl. .......... 137/81.5
[51] Int. Cl. .......... F15c 5/00
[50] Field of Search .......... 137/81.5

[56] References Cited
UNITED STATES PATENTS

| | | | |
|---|---|---|---|
| 3,362,421 | 1/1968 | Schaffer .......... | 137/81.5 |
| 3,426,781 | 2/1969 | Neuman .......... | 137/81.5 |
| 3,512,558 | 5/1970 | O'Keefe .......... | 137/81.5 |

*Primary Examiner*—William R. Cline
*Attorney*—Werner W. Kleeman

ABSTRACT: A novel construction of a fluidic component is disclosed, the fluidic component including at least one individual fluid logic element formed by main channel means as well as connection and communicating channel means associated therewith. In accordance with an important aspect of the instant invention, at least one closure wall of a channel is at least partially formed by the provision of a foil of porous material having one or more layers, such foil being embedded in and therefore imbued with a hardened adhesive.

INVENTOR
ALUN BURKE
BY Jacobi, Davidson & Kleeman
ATTORNEYS.

FLUIDIC COMPONENT WITH FLUID LOGIC ELEMENT

BACKGROUND OF THE INVENTION

The instant invention generally relates to fluidic elements and particularly concerns a new and improved fluidic component comprising at least one fluid logic element formed by main channels as well as connecting and communicating channels associated therewith.

Fluidic components generally comprise one or more fluid logic elements which form a so-called fluid amplifier or the like enabling the realization of pneumatic and hydraulic logic circuits. Such fluidic components are well known to the art and, in the manner analogous to the electronics art, such elements are designated "AND" gates, "OR" gates, "AND/OR" gates, "FLIP-FLOPS" and the like, as well as integrated circuits thereof.

The main channels of a fluid logic element of the type under consideration generally are very narrow at the actual switching locations and normally possess wall spacings of the order of magnitude of $10^{11}$mm. During the manufacture of such fluidic components, the plates or base members are provided with channel spaces adjacent the plate surface so as to effect a fluid logic element. The plate or base member is then tightly coupled with a cover plate which preferably is adhesively bonded therewith so as to provide a closure wall for the channels. During the bonding operation of the cover plate or lid to the plate or base member, the deposition of excessive adhesive material in the region of the actual switching locations of the channels must be prevented at all cost, since the presence of an excess or superfluous amount of adhesive material at a switching location oftentimes can disturb the switching characteristics of a fluid logic element to a degree where such element becomes unusable. Yet, it is necessary that the various channels be tightly sealed by the cover plate or lid which, in turn, requires the use of a sufficiently large amount of adhesive material. However, when two members each possessing smooth surfaces are adhesively bonded together, adhesive material generally is expelled or pushed out of the adhesive bonding plane.

In view of the above, prior art techniques have been developed in an attempt to eliminate the presence of a disturbing excessive amount of adhesive material in the various channels of fluidic elements. One such technique, during the adhesive bonding of the plate or base member with the cover or lid, involves initially pouring a mass of material into the various channels, such material comprising paraffin, for example, and then to bond the cover plate or lid to the base member. Finally, the mass of material is then removed from the channels in the now bonded fluidic component by washing or the like. However, this technique or method is very time-consuming and does not provide satisfactory results.

SUMMARY OF THE INVENTION

Accordingly, a need exists in the art for a fluidic component construction or more specifically for a technique of bonding the cover plate or lid to the base member which eliminates the drawbacks associated with prior art structures and techniques. It is a primary object of the instant invention to satisfy this need.

Another, more specific, yet equally important object of the instant invention concerns the provision of an improved fluidic component which can be manufactured relatively quickly and at minimum cost and which affords high operational reliability.

Now, in order to implement these and still further objects of the invention, which will become more readily apparent as the description proceeds, the novel fluidic component of the instant invention is generally manifested by the features that at least one closure wall of a channel at least partially is formed of a one or more layer foil of porous material, such foil being embedded in and therefore imbued with a hardened adhesive.

The provision of a foil of porous material in the manner contemplated by the instant invention provides definite advantages during the manufacture of fluidic components. The various channels within the base member of a fluidic component are covered with the foil which is impregnated or soaked in an adhesive material such that, after hardening, the foil forms a cover layer which is tightly connected or coupled with the base member or plate. Thereafter, a separate cover plate can be attached as by being adhesively bonded or molded thereto.

In the preferred form of the invention, it is contemplated that the foil of porous material comprise a multilayered fiber web whereby the individual layers can be applied in succession one after the other. So as to ensure that the surface layer of the closure wall which borders the channel compartment, contains foil formed of porous material, it is advantageous if a dry foil is initially placed upon the plate or base member, and thereafter, a foil soaked with adhesive is then placed over the dry foil. By virtue of this technique, it is ensured that the first applied dry foil will be fully soaked or saturated at one side with adhesive and that adhesive will only escape at the actual surface areas which are in contact with the plate or base member and which form the adhesive bond. No adhesive material can thus escape into the channels of the fluid logic element but rather can flow in the pores of the porous foil material only to the surface of the foil itself. No droplets of excess or superfluous adhesive are formed which droplets could adversely disturb the flow of the pneumatic or hydraulic fluid medium. A foil of porous material which has been constructed and processed in the above-described manner so as to be embedded and permeated with an adhesive material can be reinforced by further cover layers after the adhesive has hardened.

As should be apparent, the inventive proposed construction of a fluidic component renders possible a very simple and economical solution of the sealing problem associated with the prior art. The amount of labor necessary for manufacturing the inventive device is extremely small even during hardening of the adhesive material at room temperature, since the intermediate products during the hardening process do not require any special attention. Furthermore, the number of rejects of fluidic components during production thereof is small which is extremely important particularly in the instance of manufacture of fluidic components having a plurality of fluid logic elements contained in different plates or base members. Of course, the inoperativeness of a single fluidic element in an integrated circuit structure would result in defeating the utility of the entire fluidic component.

BRIEF DESCRIPTION OF THE DRAWINGS

The invention will be better understood and objects other than those set forth above will become apparent when consideration is given to the following detailed description of preferred inventive embodiments. Such description makes reference to the annexed drawings, wherein.

DETAILED DESCRIPTION OF PREFERRED INVENTIVE EMBODIMENTS

Figure 1:
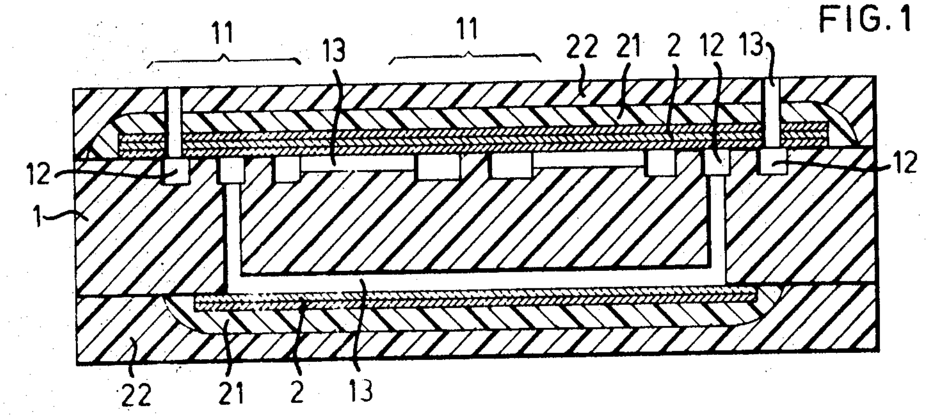
FIG. 1 is a schematic sectional view of a fluidic component containing three fluid logic elements.

Describing now the drawings, and, in particular, making reference to FIG. 1 thereof, it will be seen that the fluidic component illustrated therein comprises a plate or base member 1 formed of plastic, the base member containing three fluid logic elements 11, the fluid logic elements being essentially represented in the drawing by schematically depicted channels 12 wherein the actual switching operations occur. Channels 12 of the individual fluid logic elements 11 communicate and are connected outside the fluid component and internally with one another by means of connection and communication channels 13.

A foil 2 which is depicted as having a thickness greatly enlarged from the thickness in actual practice for purposes of explanation, is fixedly coupled with the upper side of the plate or base member 1 and is formed of porous material, preferably a multilayer fiber web, and is imbued or permeated with a hardened adhesive material such as an epoxy resin which is embedded therein. Portions of the foil 2 form a closure wall means for the channels 12 and 13 and seal such channels with respect to both one another and towards the outside. The foil or fiber web 2 is preferably reinforced with two further layers 21 and 22, for example, of hardened casting resin, layers 21 and 22 preferably being cast over the foil or fiber web 2. The connection channel 13 disposed at the lower end of the plate or base member 1 is contemplated to be sealed in a similar fashion by a foil or fiber web 2 as well as layers 21 and 22 of hardened casting resins disposed thereover.

Figure 2:
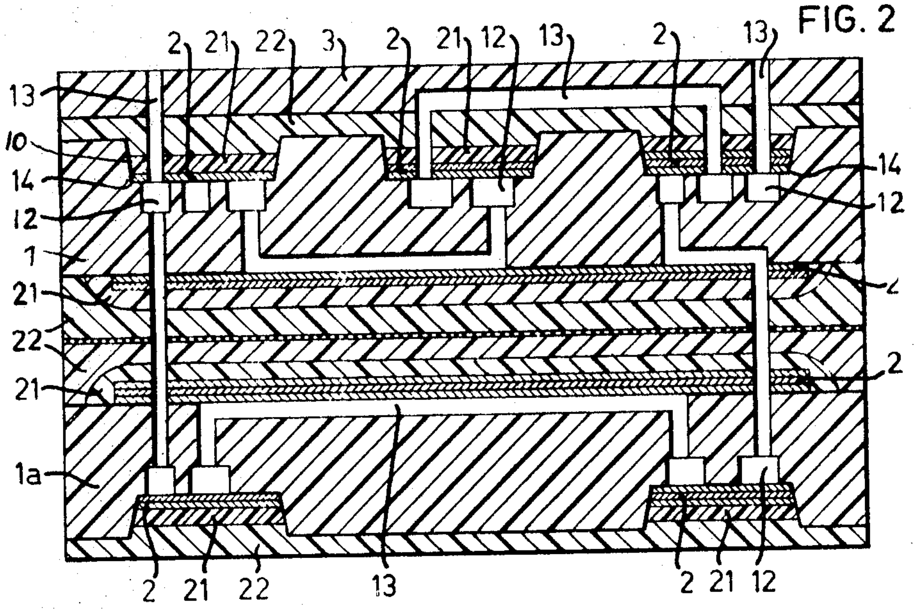
FIG. 2 is a schematic sectional view of a fluidic component containing five fluid logic elements, each element being located in recess portions of plates or base members.

Referring now to FIG. 2, a fluidic component is depicted as comprising a multilayered integrated circuit in which the individual fluid logic elements 11 are preferably disposed in truncated conical recesses 10 of the plate or base member 1 and 1*a*. Above the various channels 12 of each fluidic element 11, a fiber web 2 is respectively provided, the web 2 being fixedly bonded with the base plane 14 of the fluid logic element 11. Fiber web 2 which is embedded in the hardened adhesive and therefore imbued and saturated thereby is further reinforced by two hardened casting resin layers 21 and 22 which, for example, are molded or cast. As a consequence, faultless mutual separation of the channels 12 is ensured. The channels 13 disposed at the lower side or region of the plate or base member 1 or 1*a*, respectively, are partially bounded or delimited by fiber web 2 and the hardened adhesive material in the same manner as are the channels 12 of the fluid logic element above discussed. In the illustrated embodiment, the lower faces or surfaces of the plates or base members 1 and 1*a* are bonded to one another at the cover layer 22 of hardened casting resin. A cover plate or lid 3 containing connection and communication channels 13 is fixedly secured, preferably by bonding, with the upper side or surface of the plate or base member 1.

Figure 3:
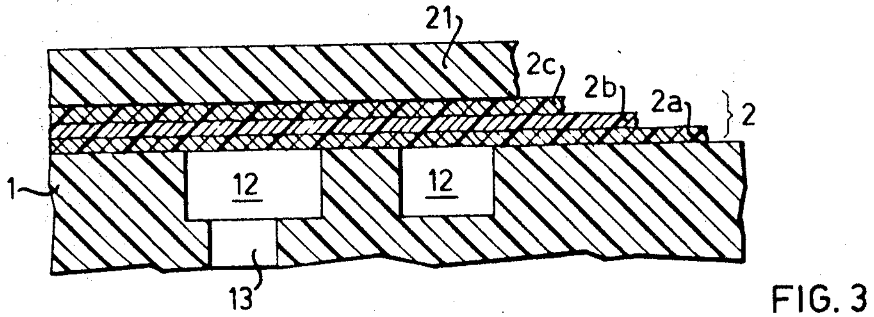
FIG. 3 is a schematic sectional view, partially broken away for illustrative clarity, of a foil formed of porous material, the foil being embedded and permeated by a hardened adhesive.

In FIG. 3, a section taken through a plate or base member 1, a multilayered fiber web 2, and a reinforced layer 21 of casting resin, is depicted or an enlarged scale. The fiber web or foil 2 is embedded in the hardened adhesive material and therefore is permeated thereby. Preferably, fiber web 2 comprises multiple layers 2*a*, 2*b*, and 2*c*. The channels 12 of the fluid logic element, the hollow compartment thereof being disposed at the surface of the plate or base member 1, are limited at their upper side by portions of the fiber web 2.

In the preferred inventive arrangement, the foil of porous material is contemplated to comprise a suitable fiber web of paper, glass, or of some suitable type of plastic. Any suitable hardening adhesive though preferably an epoxy resin can be utilized as the adhesive material. The plate or base member 1 is itself preferably formed or molded from a plastic such as epoxy resin, for example, but it is also possible to use a metallic construction.

It should now be apparent from the foregoing detailed description that the objects set forth at the outset to this specification have been successfully achieved.

I claim:

1. A fluidic component comprising at least one fluid logic element formed by channels including connection and communication channels, at least one closure wall for a channel, said closure wall at least partially comprising a foil of porous material, said foil having at least one layer and being embedded in and permeated by a hardened adhesive.

2. A fluidic component as defined in claim 1, wherein said at least one closure wall forms a boundary layer adjacent to a channel compartment.

3. A fluidic component as defined in claim 1, wherein said foil of porous material comprises at least a single layered fiber web.

4. A fluidic component as defined in claim 1, wherein said hardened adhesive comprises an epoxy resin.